United States Patent [19]

Suzuki

[11] Patent Number: 5,045,927
[45] Date of Patent: Sep. 3, 1991

[54] WHITE BALANCE ADJUSTING DEVICE
[75] Inventor: Masao Suzuki, Kanagawa, Japan
[73] Assignee: Canon Kabushiki Kaisha, Tokyo, Japan
[21] Appl. No.: 387,002
[22] Filed: Jul. 28, 1989
[30] Foreign Application Priority Data
  Aug. 8, 1988 [JP] Japan .................. 63-196032
[51] Int. Cl.⁵ ........................................ H04N 9/73 C
[52] U.S. Cl. ........................................ 358/29; 358/41
[58] Field of Search .............. 358/29, 41, 21 R, 21 V, 358/160, 31, 30
[56] References Cited
  U.S. PATENT DOCUMENTS
  4,595,946  6/1986  Uehara et al. .................. 358/29
  4,843,456  6/1989  Iida et al. ........................ 358/41

Primary Examiner—Joseph A. Orsino
Assistant Examiner—Thomas D. Lee
Attorney, Agent, or Firm—Robin, Blecker, Daley & Driscoll

[57] ABSTRACT

A white balance adjusting device comprising at least three optical sensors of different spectral sensitivity characteristics from one another, a computing circuit for calculating a ratio of outputs of the optical sensors, a ripple detecting circuit for determining whether or not light incident on the optical sensors contains ripples, a selecting circuit for selecting outputs of the computing circuit in accordance with an output of the ripple detecting circuit and a control signal forming circuit for producing control signals for controlling gains of color components of a color video signal in accordance with an output selected by the selecting circuit.

12 Claims, 5 Drawing Sheets

WHITE BALANCE ADJUSTING DEVICE

BACKGROUND OF THE INVENTION

1. Field of the Invention

This invention relates to white balance adjusting devices in color video cameras, color electronic still cameras, or other color image sensing apparatuses.

2. Description of the Related Art

To adjust the white balance of the image in the color image sensing apparatus, there has been known the automatic tracking type white balance adjusting device using a colorimetric sensor in the form independent of the image sensing system.

FIG. 1 is a block diagram illustrating the construction of an example of the prior known apparatus comprising an R sensor 10 for detecting the red color component, a B sensor 12 for detecting the blue color component, logarithmic amplifiers 14 and 16 for logarithmically compressing the outputs of the sensors 10 and 12, a differential circuit 18 for producing an output representing the difference between the outputs of the logarithmic amplifiers 14 and 16, a ripple detecting circuit 20 for determining the amount of ripples contained in the output of the differential circuit 18, a color image sensor 22 for producing R, G and B signals, a B amplifier 24 of gain control type for amplifying the B signal output of the color image sensor 22, an R amplifier 26 of gain control type for amplifying the R signal output of the color image sensor 22, control voltage generating circuits 28 and 30 responsive to the output of the differential circuit 18 and the output of the ripple detecting circuit 20 for producing control voltages $C_B$ and $C_R$ for controlling the gains of the B amplifier 24 and the R amplifier 26 respectively, a signal processing system 32 receptive of the outputs of the G output of the color image sensor 22 and the outputs of the B amplifier 24 and the R amplifier 26 for forming prescribed video signals, and a recording circuit 33.

In the white balance adjusting device of FIG. 1, what are provided in separation from the color image sensor 22 are the R sensor 10 and the B sensor 12 by which the red color component $S_R$ and the blue color component $S_B$ are detected out of an object of wide image angle (corresponding to a white object). The outputs of the sensors 10 and 12 are logarithmically compressed in passing through the logarithmic amplifiers 14 and 16, and then supplied to the differential circuit 18. The output of the differential circuit 18 represents log $S_R/S_B$. The ripple detecting circuit 20 determines the magnitude of the ripples contained in the signal log $S_R/S_B$. From the outputs of the differential circuit 18 and the ripple detecting circuit 20, the control voltage generating circuits 28 and 30 produce the control voltages $C_B$ and $C_R$. By these control voltages $C_B$ and $C_R$, the gains of the B amplifier 24 and the R amplifier 26 are controlled. Thus, white balance adjustment is effected.

In the conventional example of FIG. 1, because only two colors, namely, R and B, are sensed, for a light having no strong spectral lines in the green wavelength region, such as a fluorescent light, as compared with the sun light or tungsten light, its green component cannot be detected. Therefore, use is made of the ripple detecting circuit 20 for sensing the ripples of the signal due to the flickering of the light from the energized fluorescent lamp, so that the control voltages $C_B$ and $C_S$ are adjusted in accordance with the amount of ripples determined. In more detail, if the ripple amount is large, the light source is assumed to be the fluorescent lamp or the like, and the levels of the signals representing the red and blue components are increased to suppress its green component.

FIG. 2 in block diagram shows another example of the prior known device, where the same reference numerals have been employed to denote the similar constituent parts to those shown in FIG. 1. The device is provided with a G sensor 11, a logarithmic amplifier 15, differential circuits 34 and 36, and control voltage generating circuits 38 and 40 which are similar in construction to the control voltage generating circuits 28 and 30. In this conventional example, all the primary color components $S_R$, $S_G$ and $S_B$ of the object of wide image angle are detected by the sensors 10, 11 and 12 and are then logarithmically compressed by the logarithmic amplifiers 14, 15 and 16. The differences of the outputs of the logarithmic amplifiers 14, 15 and 16 are taken by the differential circuits 34 and 36. That is, the output of the differential circuit 36 represents log $S_R/S_G$ and the output of the differential circuit 34 represents log $S_B/S_G$. Depending on these outputs of the differential circuits 34 and 36, the control voltage generating circuits 38 and 40 produce the control voltages $C_B$ and $C_R$ respectively. The white balance is adjusted by controlling the gains of the amplifiers 24 and 26 in accordance with these control voltages $C_B$ and $C_R$.

In the conventional example of FIG. 2, because the green component, too, is detected, even if the light source is the fluorescent lamp, the correct white balance can be realized.

But, since, in the conventional example of FIG. 1, there is not always correlation between the ripple amount due to the flickering and the strength of the green component of its fluorescent lamp, even if the level of the green signal is controlled in accordance with the ripple amount, the correct white balance adjustment for every type of fluorescent lamp cannot be obtained. Another drawback is that as the level of the signal changes from other reasons than the flickering of the fluorescent lamp, it is mistaken for the flickering of the fluorescent lamp. This leads to an unduly large suppression of the green component.

The second conventional example of FIG. 2 has no such problems as described above. But, for example, in outdoor photography over a greensward, the result of colorimetry of all the sensors 10, 11 and 12 is influenced by the green color of the foreground and/or background so that the object is judged as if it were under a light source of strong green component. In this case, despite the illumination under the outdoor light, compensation of weakening the green is effected, resulting in a white balance adjustment tinted with magenta.

SUMMARY OF THE INVENTION

An object of the invention is to provide a white balance adjusting device which will overcome these drawbacks.

Another object is to provide a white balance adjusting device capable of easily removing the influence of, in particular, fluorescent lamps.

A white balance adjusting device according to an embodiment of the invention comprises at least three optical sensors of different spectral sensitivity characteristics from one another, computing means for calculating a ratio of outputs of the optical sensors, ripple detecting means for detecting whether or not incident light on the optical sensors contains ripples, selecting means for selecting outputs of the computing means according to an output of the ripple detecting means, and control signal forming means for producing control signals for gains of color components of a color video signal in accordance with a signal selected by the selecting means.

In such a manner, the ripple detecting means is provided and the signal to be used in forming the gain control signals is selected by its detection result, so that, depending on the photographic situation, an appropriate white balance adjustment can be carried out. Also, since the gain control signal is not adjusted in accordance with the ripple amount, there is no possibility of allowing the detection of the presence of ripples to make compensation with undue emphasis on the green component.

Other objects and features of the invention will become apparent from the following written specification and drawings.

DETAILED DESCRIPTION OF THE PREFERRED EMBODIMENTS

The present invention is next described in connection with embodiments thereof by reference to the drawings.

Figure 1:
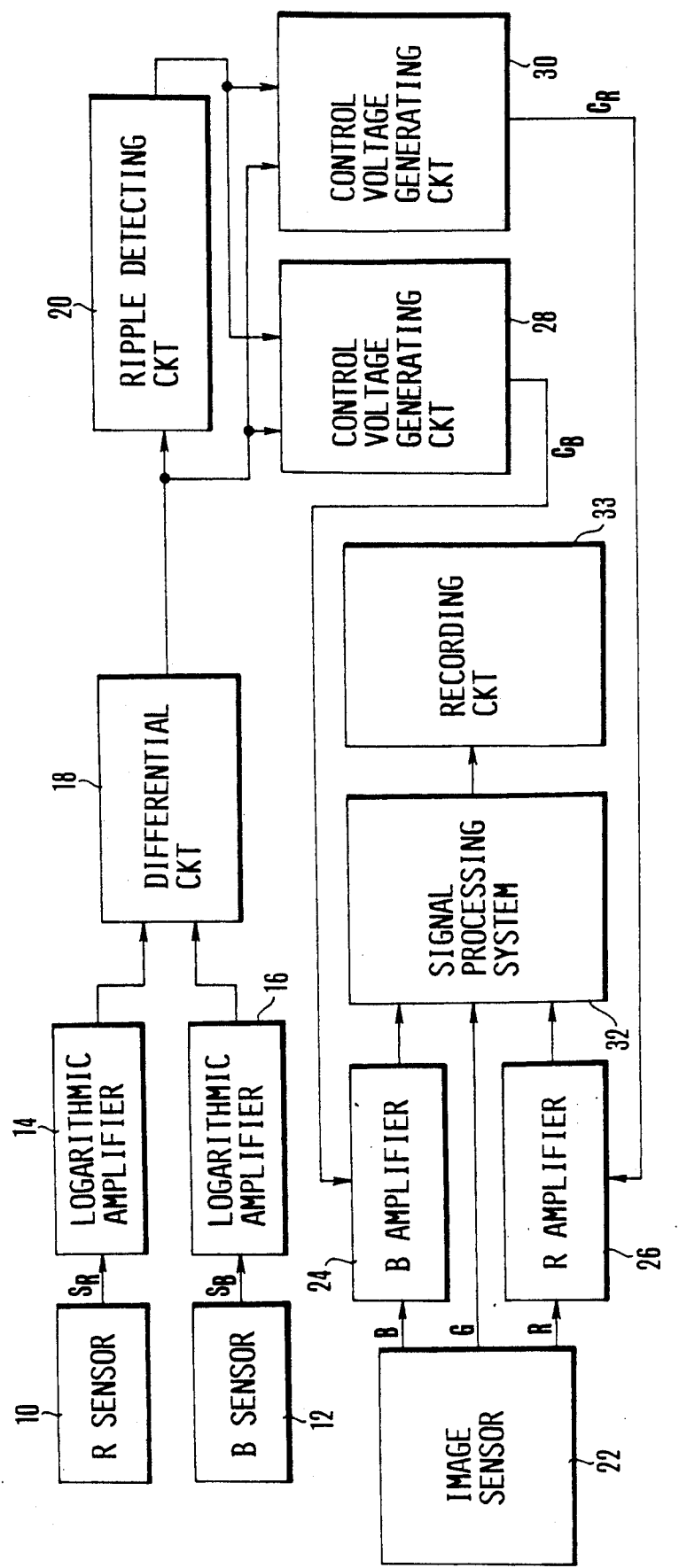
FIG. 1 and FIG. 2 are block diagrams of the construction of conventional examples.
Figure 2:
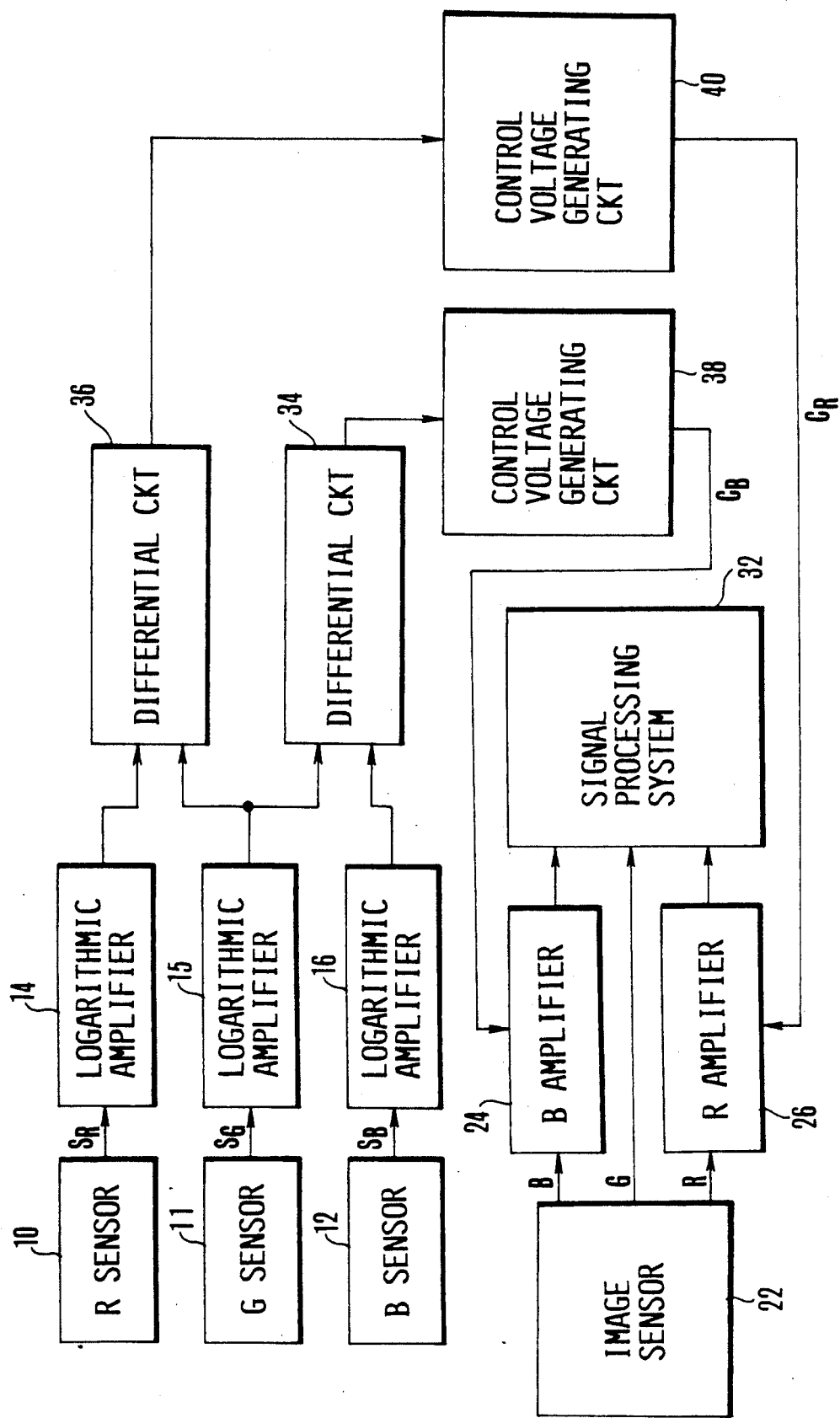
Figure 3:
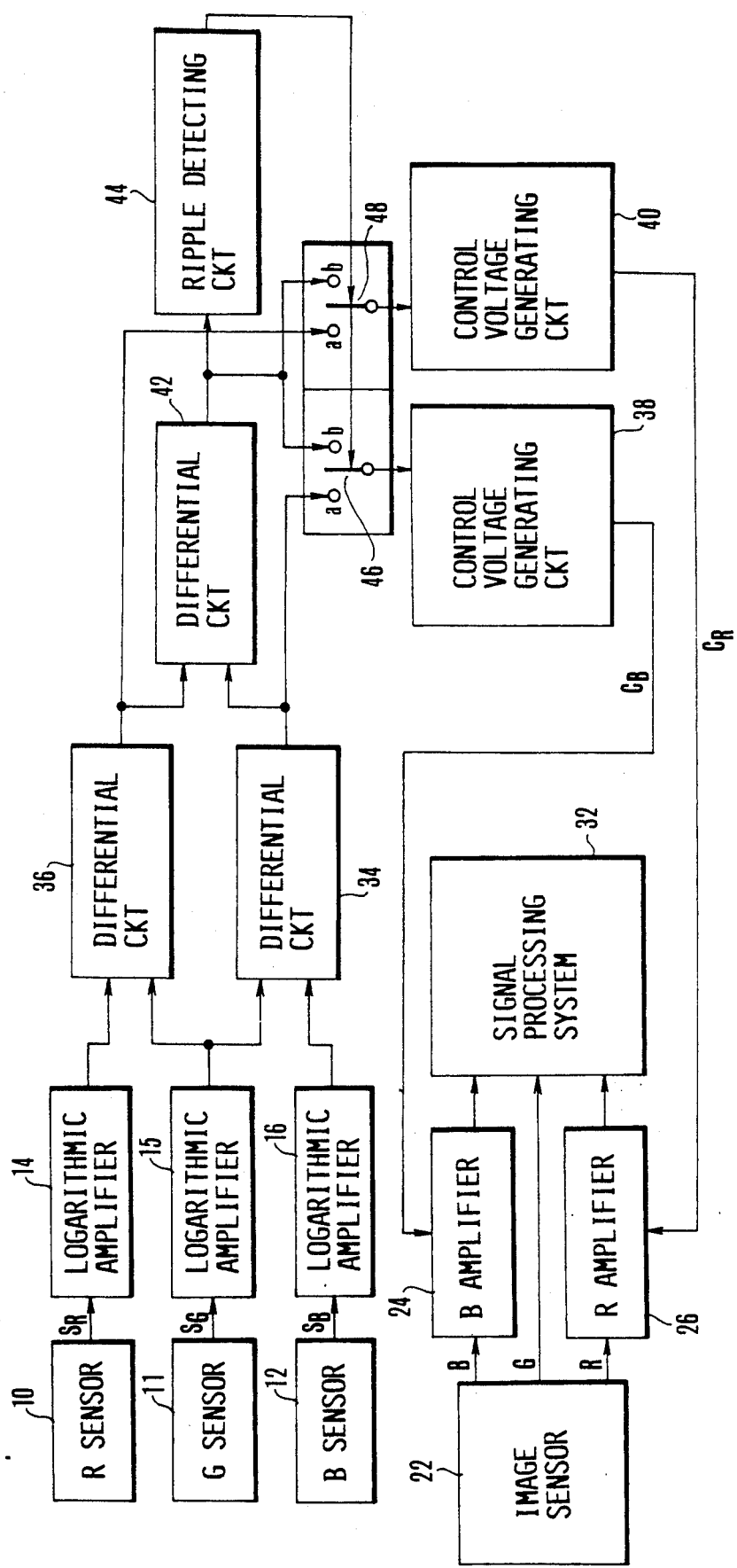
FIG. 3 is a block diagram of the construction of an embodiment of the invention.

FIG. 3 in block diagram shows one embodiment of the invention where the same constituent parts as those in FIG. 1 and FIG. 2 are denoted by the same reference characters. The device comprises a differential circuit 42 for taking the difference of the outputs of the differential circuits 36 and 34, a ripple detecting circuit 44 for detecting whether ripples are present or absent in the output of the differential circuit 42, a switch 46 responsive to the output of the ripple detecting circuit 44 for selecting one of the outputs of the differential circuits 34 and 42 to be supplied to the control voltage generating circuit 38, and another switch 48 responsive to the output of the ripple detecting circuit 44 for selecting one of the outputs of the differential circuits 36 and 42 to be supplied to the control voltage generating circuit 40.

The operation of the device of FIG. 3 is described below. As has previously been described, the differential circuit 36 produces the output representing log $S_R/S_G$, and the differential circuit 34 produces the output representing log $S_B/S_G$. The differential circuit 42 therefore, produces an output representing log $S_R/S_B$. The ripple detecting circuit 44 receptive of the output of the differential circuit 42 for detecting whether ripples are present or absent. If the ripple detecting circuit 44 determines that it has ripples, the switches 46 and 48 are connected to their "a" contact sides. Conversely when it determines that there are no ripples, the switches 46 and 48 are connected to their "b" sides. Hence, when ripples occur, the control voltage generating circuits 38 and 40 are given the outputs log $S_B/S_G$ and log $S_R/S_G$ of the differential circuits 34 and 36 respectively when forming the control voltages $C_B$ and $C_R$. When no ripples occur, it is from the output log $S_R/S_B$ of the differential circuit 42 that the control voltage generating circuits 38 and 40 form the control voltages $C_B$ and $C_R$.

The thus obtained control voltages $C_B$ and $C_R$ are used for controlling the gains of the amplifiers 24 and 26 when the white balance is adjusted.

In short, for illumination under the energized fluorescent lamp, because ripples are detected, with the use of the outputs of the differential circuits 34 and 36, the green signal level is factored into the gain control. Since no such adjustment of the control voltages $C_B$ and $C_R$ in accordance with the ripple amount is made, even when ripples are detected, despite the illumination not under the energized fluorescent lamp, there is no possibility of occurrence of an unnecessary green compensation. Also, as in outdoor photography on lawn, or like situation where a subject is surrounded by the environment of green objects, because of the lack of flickering, the ripple detecting circuit 44 does not detect ripples. Therefore, the switches 46 and 38 are connected to the "b" contacts, so that the control voltages $C_B$ and $C_R$ are formed based only on the ratio of the R component and the B component. Thus, no compensation which would otherwise weaken the green color is carried out. In such a way, the white balance adjustment which is always right can be realized.

Though, in the embodiment of FIG. 3, log $S_R/S_B$ has been obtained by computing the difference between the outputs of the differential circuits 34 and 36, the computation may otherwise be done by taking the difference of the outputs of the logarithmic amplifiers 14 and 16, so that log $S_R/S_B$ is obtained directly.

Figure 4:
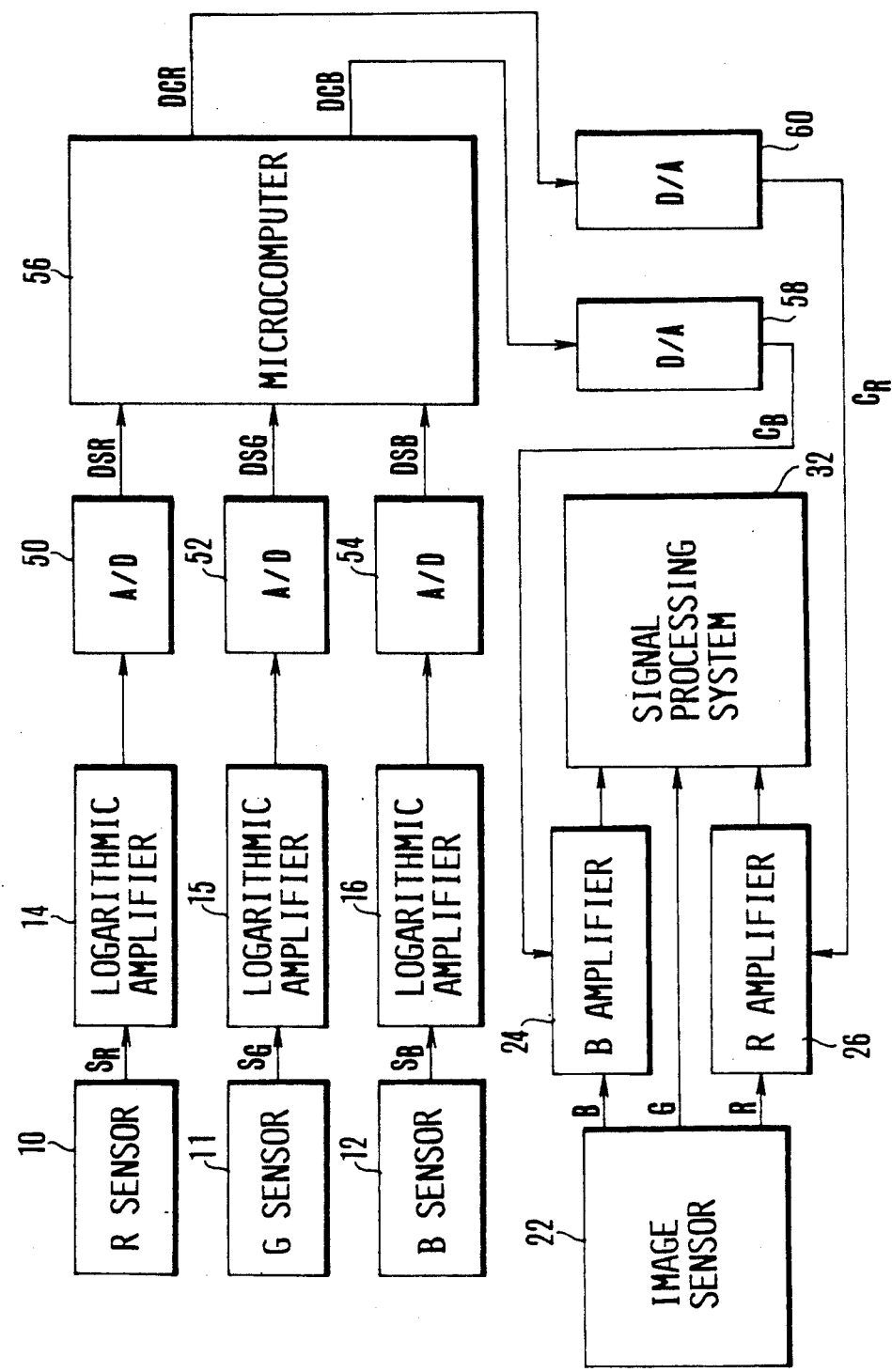
FIG. 4 is a block diagram of the construction of another embodiment.

FIG. 4 in block diagram shows another embodiment where the control voltages $C_B$ and $C_R$ are determined by software computation with the use of a microcomputer. The outputs of the logarithmic amplifiers 14, 15 and 16 are digitized by A/D converters 50, 52 and 54 respectively, before they are supplied to the microcomputer 56. The microcomputer 56 computes the digital values DSR, DSG and DSB from the A/D converters 50, 52 and 54 based on a predetermined formula and produces outputs representing digital control voltage values DCB and DCR. D/A converters 58 and 60 convert these digital control voltage values DCB and DCR into analog form, before they are supplied to the gain control terminals of the amplifiers 24 and 26.

Figure 5:
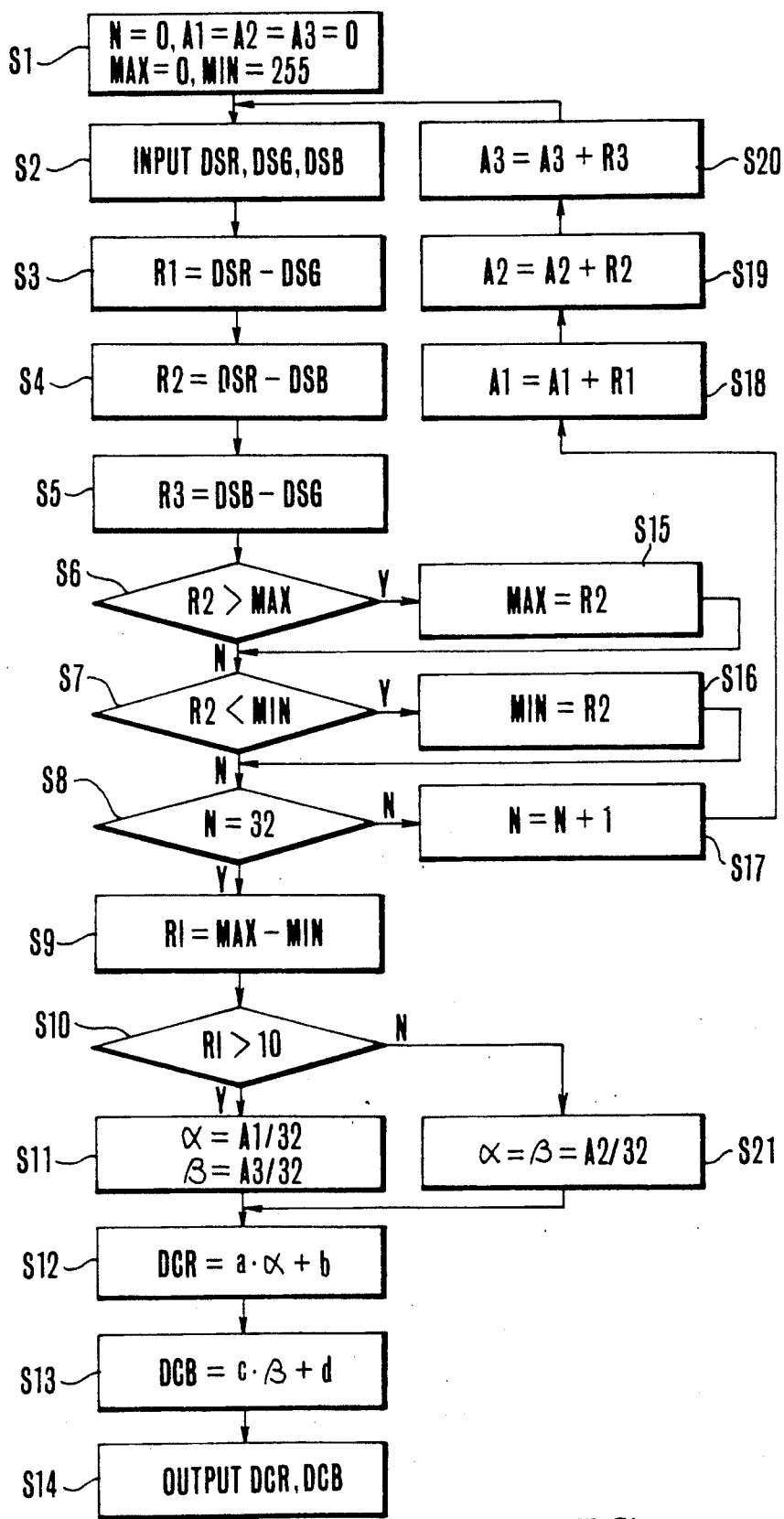
FIG. 5 is a flowchart for the operation of the microcomputer 56 of FIG. 4.

FIG. 5 shows a flowchart for the computation in the microcomputer 56. The program of FIG. 5 is explained in detail below. It should be pointed in connection with this example that reading of the outputs of the A/D converters 50, 52 and 54 is recycled 32 times to obtain an average before the control voltage data DCB and DCR are determined. A1, A2 and A3 denote variables for the averaging purpose. To begin with, a variable N representing the number of times which a loop is repeated, and the variables A1, A2 and A3 are initialized to "0", and variables MAX and MIN are initialized to "0" and "255", respectively (step S1). The outputs DSR, DSG and DSB of the A/D converters 50, 52 and 54 are read in (step S2) and their differences are computed (steps S3, S4 and S5). If the difference R2 (=DSR−DSB) is larger than the variable MAX, R2 is substituted for MAX (steps S6 and S15). If R2 is smaller than the variable MIN, R2 is substituted for MIN (steps S7 and S16). If N is smaller than "32" (step S8), N is incremented (step S17), and the differences R1, R2 and R3 are cumulatively added to the variables A1, A2 and A3 (steps S18, S19 and S20). Then the outputs DSR, DSG and DSB of the A/D converters 50, 52 and 54 are read in again (step S2).

When N becomes equal to "32" (step S8), the ripple fraction RI is computed from the difference between MAX and MIN (step S9). If RI is larger than "10" (LSB), $\alpha = A1 \div 32$ and $\beta = A3 \div 32$ are made (step S11). If RI is equal to or smaller than "10", $\alpha = \beta = A2 \div 32$ is made (step S21). And, based on the predetermined constants a, b, c and d, by $DCR = a \cdot \alpha + b$ and $DCB = c \cdot \beta + d$, the values of DCR and DCB are determined (steps S12 and S13). The result is output from the output ports to the D/A converters 58 and 60 (step S14).

Though, in the above-described embodiment, the presence or absence of ripples has been detected from the signal log $S_R/S_B$, it is of course possible to do it from another signal log $S_R/S_G$ or log $S_B/S_G$, or to detect it directly from the outputs of the sensors 10, 11 and 12 or the outputs of the logarithmic amplifiers 14, 15 and 16.

As will be easily understandable from the foregoing, according to the invention, even when photographic situations where illumination comes from the energized fluorescent lamp or like light source whose green component is strong, or the environment is entirely green as on the lawn foreground and/or background, a correct white balance adjustment can be realized.

What is claimed is:

1. A white balance adjusting device comprising at least three optical sensors of different sensitivity characteristics from one another, computing means for calculating a ratio of outputs of said optical sensors, ripple detecting means for detecting whether or not light incident on said optical sensors contains ripples, selecting means for selecting outputs of said computing means in accordance with an output of said ripple detecting means, and control signal forming means for forming control signals for controlling gains of color components of a color video signal in accordance with an output selected by said selecting means.

2. A device according to claim 1, wherein said three optical sensors are R, G and B sensors.

3. A device according to claim 2, wherein said ripple detecting means detects ripples on the basis of outputs of said R sensor and said B sensor.

4. A device according to claim 1, wherein said selecting means has a first mode in which said control signals are formed by using outputs of said three optical sensors and a second mode in which said control signals are formed by using outputs of two of said optical sensors.

5. A device according to claim 4, wherein said three optical sensors are R, G and B sensors.

6. A device according to claim 5, wherein in said second mode, said selecting means selects outputs of said R sensor and said B sensor to be used in forming said control signals.

7. An image sensing apparatus comprising:
 (a) image sensing means for forming color video signals as an output signal;
 (b) a plurality of different color sensors from each other;
 (c) detecting means for detecting ripples of ambient light; and
 (d) control means for varying a combination of outputs of said plurality of color sensors in accordance with an output of said detecting means to form control signals for controlling a color balance of the output signal of said image sensing means.

8. An apparatus according to claim 7, wherein said plurality of color sensors include R, G and B sensors.

9. An apparatus according to claim 8, wherein said detecting means detects ripples from outputs of said R sensor and said B sensor.

10. An apparatus according to claim 7, wherein said control means changes the number of outputs of said plurality of color sensors which are to be used for forming the control signals in accordance with the output of said detecting means.

11. An apparatus according to claim 10, wherein said plurality of color sensors include R, G and B sensors.

12. An apparatus according to claim 11, wherein said control means changes over between a mode in which the control signals are formed from outputs of said R, G and B sensors and another mode in which the control signals are formed from outputs of said R and B sensors in accordance with the output of said detecting means.

* * * * *